C. M. MANLY.
DUMPING WAGON.
APPLICATION FILED OCT. 11, 1911.
1,110,450.
Patented Sept. 15, 1914.
3 SHEETS—SHEET 1.
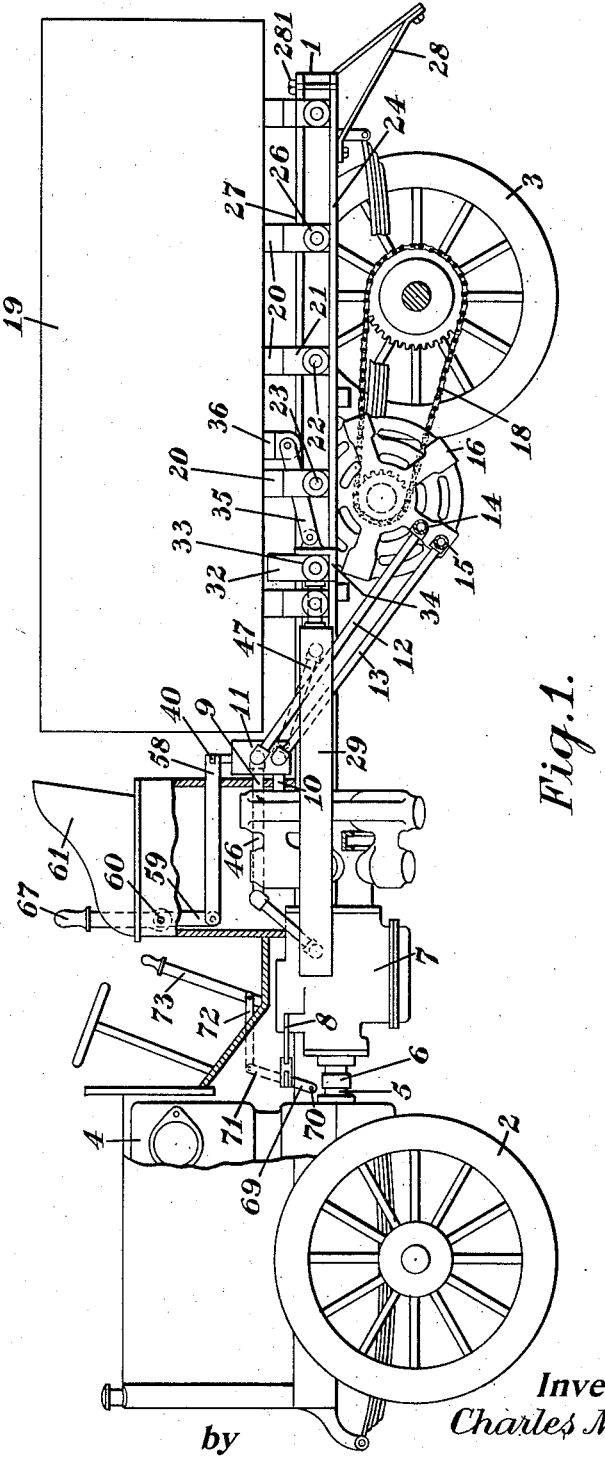
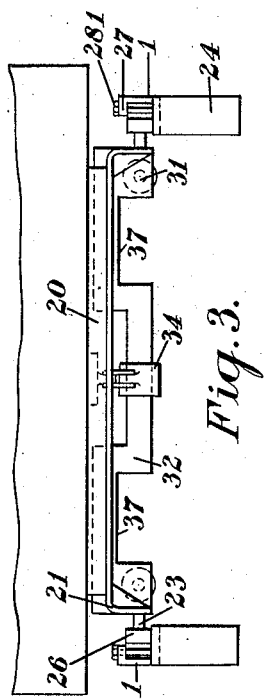
Attest:
S. Newman
C. V. Morton
Inventor:
Charles M. Manly,
by W. B. Morton
Atty.

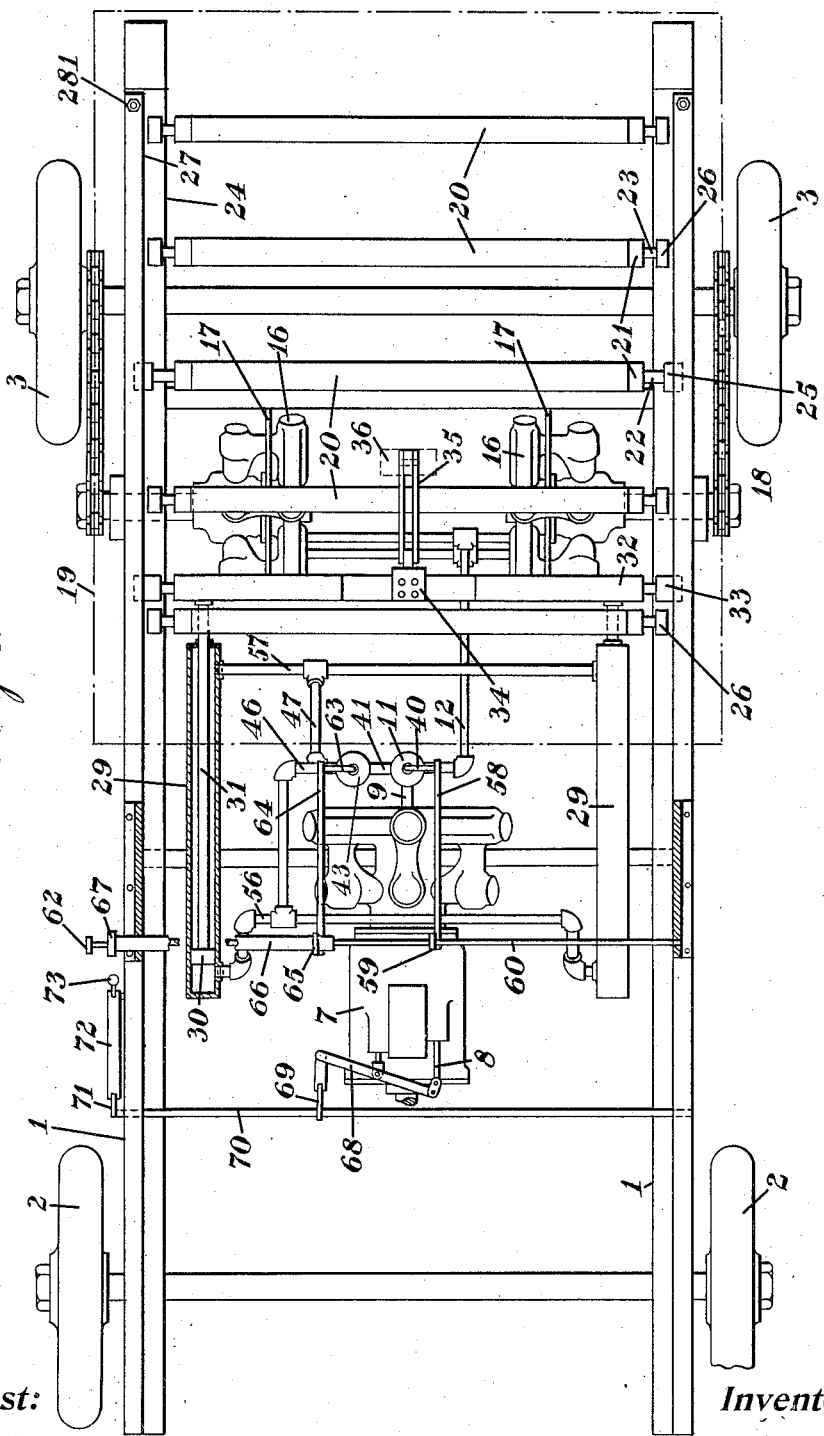

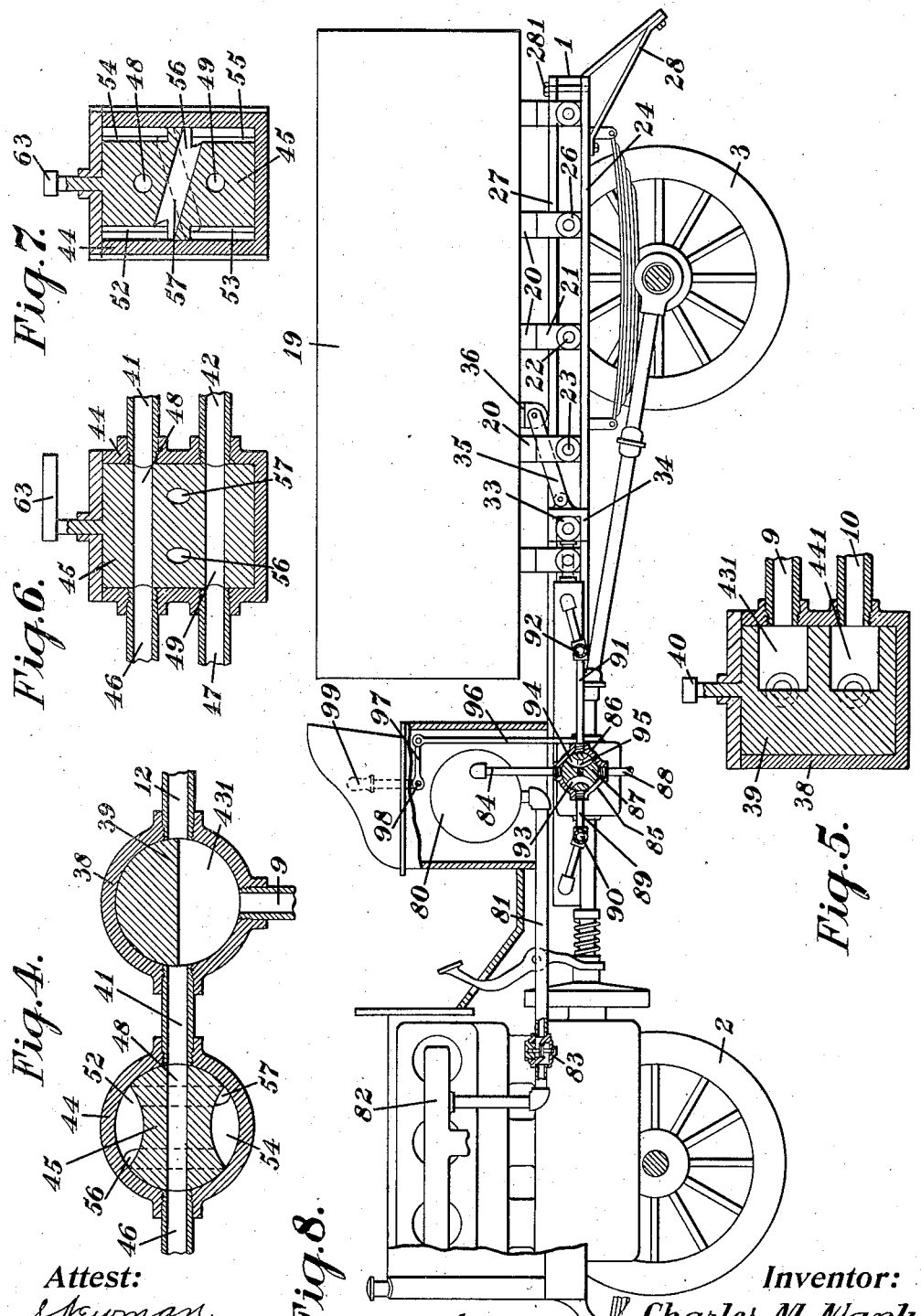

UNITED STATES PATENT OFFICE.

CHARLES MATTHEWS MANLY, OF FREEPORT, NEW YORK.

DUMPING-WAGON.

1,110,450.  Specification of Letters Patent.  Patented Sept. 15, 1914.

Application filed October 11, 1911. Serial No. 654,130.

*To all whom it may concern:*

Be it known that I, CHARLES M. MANLY, a citizen of the United States, residing at Freeport, Long Island, New York, have invented certain new and useful Improvements in Dumping-Wagons, of which the following is a specification.

My invention relates to dumping wagons and cars and is particularly applicable to power driven road vehicles.

One object of my invention is to provide, in a vehicle of the class described, means whereby the power of the driving mechanism may be utilized for effecting the dumping operation.

Another object of my invention is to provide a dumping vehicle in which the dumping mechanism is simple, compact, easy to operate and not liable to get out of order.

With these objects in view my invention comprises a vehicle having a tilting body and fluid pressure operated mechanism for tilting the body and restoring it to normal position. My invention is therefore particularly applicable to vehicles provided with a hydraulic variable speed gear and in the accompanying drawings I have shown my invention as applied to a vehicle provided with a hydraulic transmission of the type disclosed in my pending application Serial No. 606,618 filed Feb. 4, 1911, and also as applied to a vehicle driven by an internal combustion engine with the usual gear transmission.

In the said drawings, Figure 1 is a side elevation partly in section of a dumping wagon provided with a hydraulic transmission of the type referred to. Fig. 2 is a plan view partly in section, with certain parts removed, of the vehicle shown in Fig. 1. Fig. 3 is an end view of the vehicle frame and body. Figs. 4, 5, 6, and 7 are details of the valve mechanism for controlling the fluid pressure operated dumping mechanism. Fig. 8 is a side elevation partly in section of a dumping wagon having the usual gear transmission.

Referring now to the drawings and particularly to Figs. 1 to 7, 1 indicates the side members of the vehicle frame formed of channel iron as hereinafter described, and supported in the usual manner on the front and rear wheels 2 and 3 respectively. Mounted on the forward part of the frame is an internal combustion engine 4 whose shaft 5 is directly connected by the coupling 6 to the shaft of the pump element 7 of the hydraulic variable speed gear before referred to. This hydraulic gear forms *per se* no part of the present invention, being substantially identical with that disclosed in my prior application above mentioned. It is therefore not shown in detail in this case, but comprises essentially a multi-cylinder variable stroke pump having its stroke varying means controlled by a single sliding rod 8 whereby the fluid delivered by the pump may be varied from a maximum quantity flowing in one direction, when the control rod 8 is in one extreme position of adjustment, through zero to a maximum quantity, flowing in the opposite direction, when the control rod is in its other extreme position. Two pipes, 9, 10 for the delivery and return of fluid from and to the pump, connect the pump with a three-way valve 11, to be later described, and from the valve 11 pipes 12 and 13 lead, respectively, to pipes 14 and 15, connecting the intake ports and delivery ports of the two hydraulic driving motors 16. The motors 16 are suspended beneath the vehicle frame by brackets 17 and their shafts are connected by chains 18 with the driving wheels 3. It will be obvious that when the control rod 8 is set at one side of its central or zero position, the vehicle will be driven in one direction at a speed depending on the quantity of fluid delivered by the pump and when the rod is adjusted to the other side of its zero position the vehicle will be driven in the reverse direction. The vehicle body 19 has attached to its under surface a plurality of transverse bolsters 20, here shown as five in number, provided at each end with downwardly projecting brackets 21 having laterally extending stub axles. The axles 22 of the middle bolster, which is somewhat nearer the rear end of the body than the front end, project beyond the axles 23 of the other bolsters and all of the axles are provided with rollers resting on the top surface of the under flange 24 of the side frame members 1. The rollers 25 on the middle bolster are wider than the other rollers 26 and lie between the flange 24 and the upper flange 27 which is narrower than the flange 24, whereas, the rollers 26 rest entirely on the projecting portion of the flange 24. The rear ends of the flanges 24 project beyond the flanges 27 and the vertical webs of the members 1, and are bent downward as shown in Fig. 1, and stiffened by braces 28. Stop bolts 281 are fastened to the members 1 across their channels at the ends of the flanges 27 to be engaged by the rollers 25 when the body 19 is moved backward on the frame, as will now be described. Extending parallel to, and just within the side frame memers 1 are two cylinders 29, fixedly supported in any suitable manner, not shown. The cylinders 29 are provided with pistons 30, only one of which is shown, whose rods 31 project from the rear ends of the cylinders and are attached to a cross beam 32 having rollers 33 on its ends, which rollers travel on the flange 24 and lie between the flanges 24 and 27. A bracket 34 is attached to the beam 32 at its middle point and links 35 connect the bracket 34 with a bracket 36 attached to the bottom of the body 19. The cross beam 32 is formed with cut-away portions 37 as shown in Fig. 3 to clear the motors 16 when the beam is moved along the frame members. The valve 11 with which the pipes 9 and 10 from the pump 7 connect is shown in detail in Figs. 4 and 5 and comprises a casing 38 having a cylindrical valve body 39 rotatably mounted therein and provided with an actuating lever 40 whereby it may be set in its different positions of adjustment. The pipes 9 and 10 are on the same side of the valve casing but at different levels and the pipes 12, 13 to the motors connect with the casing at points 90 degrees angularly distant from the pipes 9 and 10, the pipe 12 being on the same plane as the pipe 9, and the pipe 13 on the plane of the pipe 10. Diametrically opposite the pipes 12 and 13 respectively are two pipes 41 and 42 through which the fluid passes to and from the opposite ends of the cylinders 29. The valve body 39 has two similar ports 431, 441, each formed by cutting away a semi-cylindrical portion of the block slightly greater in width than the bores of the pipes. The ports 431 and 441 are separated by the un-cut middle portion of the valve body so that in effect the valve 11 forms two valves, one serving to interconnect and disconnect the pipes 9, 12 and 41 when the valve body 39 is turned in its casing, and the other to simultaneously connect or disconnect the pipes 10, 13 and 42. The pipes 41 and 42 as shown, do not lead directly to the ends of the cylinders 29, but preferably connect with a reversing valve 43 arranged adjacent thereto and comprising a cylindrical casing 44 (Figs. 4, 6, and 7) having a valve body 45 rotatably mounted therein. Pipes 46, 47 connect with the casing 44 at points diametrically opposite the pipes 41, 42, and the valve body 45 is provided with two transverse ports 48, 49 so that when the valve body is set in one position the pipes 46, 47 form direct continuations of the pipes 41, 42, respectively. The sides of the valve body 45 between the ends of the ports 48, 49 are cut away to form four ports 52, 53, 54 and 55 adapted to register respectively with the pipes 41, 42, 46, 47 when the valve body 45 is turned to a position 90 degrees distant angularly from the position described above. A transverse port 56 connects the ports 52 and 55 and a similar port 57 connects the ports 53 and 54 so that when the valve body 45 is adjusted to its last described position the pipes 41 and 47 will be connected and also the pipes 42 and 46. The pipe 46 connects with a cross pipe 56' connecting the front ends of the cylinders 29 and the pipe 47 connects with a cross pipe 57 connecting the rear ends of the cylinders. The actuating lever 40 of the valve 11 has connected to it a link 58 to whose other end is attached an arm 59 depending from a rock shaft 60 extending across the vehicle under the seat 61. A handle 62 (see Fig. 2) is connected to the projecting end of the shaft 60 within reach of the driver. The valve 43 is provided with an arm 63 which is connected by a link 64 with an arm 65 on a sleeve 66 rotatably supported on the shaft 60. The sleeve 66 projects through the side wall of the seat and is provided with a handle 67 similar to the handle 62. For operating the stroke controlling rod 8 any suitable connections may be employed. I have shown for that purpose a lever 68 fulcrumed on the pump casing and connected at one end to the rod 8 and at its other to an arm 69 attached to a rock shaft 70 mounted on the frame and projecting beyond one of the side members 1. An arm 71 is attached to the projecting end of the shaft 70 and is connected by a link 72 with the operator's lever 73 fulcrumed on the side member 1.

Let it be assumed that the pipe 9 is receiving fluid under pressure from the pump 7, and that the valve 11 is set so as to entirely close the pipe 41 and completely uncover the pipe 12 to the motors. All the fluid from the pump will pass through the motors propelling the vehicle in a forward direction, returning to the pump through the pipe 13 port 441 and pipe 10. If the driver wishes to dump the load at one point he brings the vehicle to a stop by shifting his control lever 73 to its zero position. He then by means of the handle 62, turns the valve body 39 to cut off the pipes 12 and 13 and connect the pipes 9 and 10 with the pipes 41 and 42 leading to the valve 43 which valve is set as shown in Fig. 6 so that the pipe 46 which leads to the front ends of the cylinders is connected with the pipe 9 from the pump and the pipe 47 from the rear ends of the cylinders is connected with the pipe 10 which returns the fluid to the pump. The driver then moves the control lever 73 in the direction for forward driving thereby causing the pump to deliver fluid under pressure to the pipe 9 and thence to the front ends of the cylinders 29 behind the pistons 30. The movement of the pistons causes the cross beam 32 to move rearwardly along the frame members 1 and through the links 35, roll the body along the frame until the rollers 25 on the middle bolster 20 engage the stop pins 281. Continued movement of the cross beams 32 causes the body 19 to turn on the rollers 25 as a center until the rollers 26 on the bolster immediately to the rear of the middle bolster engage the downwardly inclined projecting portions of the frame members, when the driver returns the lever 73 to its zero position to stop the delivery of fluid to the cylinders 29. In this position the body is sufficiently inclined to dump its load. When the driver wishes to return the body to its normal position he has merely to move the lever 73 out of its zero position in a direction opposite to that described which, as stated above, causes the direction of flow of the fluid to be reversed, thereby delivery the fluid under pressure from the pump to the rear ends of the cylinders 29 and causing the cross beam 32 to move toward the front of the vehicle. As the rollers 26 of the second bolster from the rear rest on the inclined projecting ends of the frame members, the forward movement of the cross beam 32 restores the body to horizontal position and then moves it forward to the position shown. If the driver desires to dump the wagon without stopping it, as is frequently necessary in grading, etc., he has merely to turn the valve 11 from the position in which the pipes 41 and 42 are fully cut off to the position shown in Figs. 4 and 5, leaving the valve 43 in the position shown in Figs. 4 and 6, thereby permitting a portion of the fluid to pass to the front ends of the cylinders 29 while the rest of the fluid continues to pass through the motors and drive the vehicle. After the vehicle is dumped the driver can return the body to its normal position without stopping by operating the handle 67 to turn the valve 43 a quarter of a revolution, thereby directing the fluid from the pipe 41 to the rear ends of the cylinders 29 and connecting the front ends of the cylinders with the pipe 42 to permit the fluid in the cylinders to return to the pump.

In Fig. 8 of the drawing I have shown my invention as applied to a motor truck driven by an internal combustion engine but having the usual mechanical transmission instead of a hydraulic variable speed transmission. In this case the frame members, the body, the roller mechanism and the dumping cylinders, pistons and connections may all be substantially identical with the corresponding parts of the vehicle having the hydraulic transmission. In the drawing I show the vehicle in part section with the adjacent frame member 1 and cylinder 29 removed for clearness of illustration. To maintain a supply of fluid under pressure for operating the pistons 31, I preferably mount beneath the seat of the vehicle a supply tank 80 having a feed pipe 81 connecting with fluid pressure containing ports or passages of the internal combustion engine, and for convenience I have here shown it as connected to the exhaust port 82. A check valve 83, opening from the exhaust into the tank, is mounted in the pipe 81 so that as long as the pressure in the tank is below the maximum exhaust pressure in the port 82 the valve will open to permit a portion of the exhaust to enter the tank. As the check valve is held closed whenever the pressure in the tank exceeds the pressure in the exhaust port, it is obvious that while the engine is running the tank will be kept charged with gas under pressure equal to the maximum exhaust pressure. A pipe 84 connects the tank with a four-way valve 85 arranged between the cylinders 29 and comprising a horizontally arranged cylindrical casing 86 having a valve body 87 mounted to turn therein. The pipe 84 connects with a port at the top of the casing 86 and diametrically opposite thereto is an exhaust pipe 88. A pipe 89 projects forwardly from the casing 86 and connects with a cross pipe 90 connecting the front ends of the cylinders 29 and a pipe 91 projects rearwardly from the casing 86 and connects with a cross pipe 92 connecting the rear ends of the cylinders. The valve body 87 is provided with two ports 93, 94 adapted in one position of adjustment to connect the pipe 84 with the pipe 89 and the pipe 91 with the pipe 88, and in another position of adjustment to connect pipes 84 and 91 and pipes 89 and 88. The valve body 87 is provided with an operating arm 95 (shown dotted in Fig. 8) which is connected by a link 96 with an arm 97 carried by a rock shaft 98, which shaft projects beyond the seat as shown, and is provided with a handle 99. In operation the driver normally keeps the valve 85 set in the position shown or he may set it so that the pipe 84 connects with the pipe 91 leading to the rear ends of the cylinders 29 so that the fluid pressure in the tank will hold the pistons 30 and the cross beam 32 in their forward positions. When it is desired to dump the contents of the body the driver shifts the handle 99 to turn the valve 85 to connect the pipe 84 with the pipe 89 leading to the front ends of the cylinders and the pipe 91 to the exhaust pipe 88. The fluid pressure from the storage tank 80 will then shift and tilt the vehicle body in the manner described above. To restore the body the valve is turned a quarter of a revolution to connect the pipe 84 with the pipe 91 to direct the fluid pressure into the rear ends of the cylinders 29 to move the cross beam 32 back to the position shown.

I claim—

1. In a vehicle, the combination of a frame, a body mounted on said frame for pivotal movement relatively thereto, means for driving the vehicle comprising an hydraulic transmission mechanism, means for moving said body relatively to said frame comprising a fluid pressure operated mechanism, and connections between said mechanism and said transmission mechanism for conveying fluid under pressure to said operating mechanism and returning it therefrom to said transmission.

2. In a vehicle, the combination of a frame, means for driving the vehicle comprising an hydraulic variable speed gear, a body for the vehicle mounted on the frame for pivotal movement relatively thereto, means for moving the body relatively to the frame comprising a cylinder and piston operatively connected respectively with the frame and the body, and means for delivering fluid under pressure from said hydraulic gear to said cylinder and for returning said fluid from the cylinder to said gear.

3. In a vehicle, the combination of a frame, a dumping body mounted thereon for movement relatively thereto, a driving mechanism for said vehicle comprising an hydraulic variable speed gear, a mechanism for operating said dumping body comprising an operating cylinder and piston therein, fluid connections with the opposite ends of said cylinder, and means for simultaneously connecting one end of said cylinder with the pressure side of said variable speed gear, and the opposite end of said cylinder with the exhaust side of said speed gear.

4. In a vehicle, the combination of a frame, a dumping body mounted thereon for movement relatively thereto, a driving mechanism for said vehicle comprising an hydraulic variable speed gear, a mechanism for operating said dumping body comprising an operating cylinder and piston therein, fluid connections with the opposite ends of said cylinder, and means for connecting either end of said cylinder with the pressure side of said transmission and simultaneously connecting the other end of said cylinder with the exhaust, or low-pressure, side of said speed gear.

5. In a vehicle, the combination of a frame, comprising longitudinal side members formed of channel iron having its bottom flange wider than its top flange, a body, rollers on which said body is mounted adapted to travel on said bottom flange, said rollers being arranged in pairs with the rollers of one pair spaced apart to lie between the said flanges, the other of said rollers being spaced to pass between the inner edges of said upper flanges, and stops between said flanges adjacent the rear ends of said frame members.

6. In a vehicle, the combination of a frame comprising longitudinal side members forming a trackway, a body, rollers on which said body is supported adapted to travel on said trackway, one of said rollers projecting laterally beyond other of said rollers, a stop adjacent the rear end of said frame adapted to be engaged by said projecting roller, driving means for said vehicle embodying means for generating fluid pressure, a cylinder attached to said vehicle frame and extending longitudinally thereof, a piston in said cylinder, a link connecting said piston with said body and fluid transmitting connections embodying a valve mechanism for controlling the admission and exhaust of fluid pressure to and from the opposite ends of said cylinder.

In testimony whereof, I have signed my name to this specification in the presence of two subscribing witnesses, this 7th day of October 1911.

CHARLES MATTHEWS MANLY.

Witnesses:
　Thos. A. Warner,
　Ada I. Miller.